(12) United States Patent
Choi et al.

(10) Patent No.: US 10,445,857 B2
(45) Date of Patent: Oct. 15, 2019

(54) ELECTRONIC FRAME AND IMAGE DISPLAYING METHOD OF ELECTRONIC FRAME

(71) Applicant: LG ELECTRONICS INC., Seoul (KR)

(72) Inventors: Jiho Choi, Seoul (KR); Saehun Jang, Seoul (KR); Dami Choe, Seoul (KR); Junhee Yeo, Seoul (KR); Boram Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/746,057

(22) PCT Filed: Feb. 24, 2016

(86) PCT No.: PCT/KR2016/001776
§ 371 (c)(1),
(2) Date: Jan. 19, 2018

(87) PCT Pub. No.: WO2017/014392
PCT Pub. Date: Jan. 26, 2017

(65) Prior Publication Data
US 2018/0211362 A1    Jul. 26, 2018

(30) Foreign Application Priority Data

Jul. 20, 2015    (KR) .................. 10-2015-0102159

(51) Int. Cl.
*G06T 3/40*    (2006.01)
*G02F 1/133*    (2006.01)
(Continued)

(52) U.S. Cl.
CPC ............ *G06T 3/40* (2013.01); *G02F 1/13318* (2013.01); *G02F 1/13338* (2013.01);
(Continued)

(58) Field of Classification Search
None
See application file for complete search history.

(56) References Cited

U.S. PATENT DOCUMENTS

2008/0246871 A1    10/2008    Kupper et al.
2011/0068259 A1*    3/2011    Daly ................. H01L 27/14618
250/227.29
(Continued)

FOREIGN PATENT DOCUMENTS

KR    10-2014-0025231    3/2014

OTHER PUBLICATIONS

Paul Thurrot ("Windows 10 Feature Focus: Display Scaling", https://www.thurrott.com/windows/windows-10/4597/windows-10-feature-focus-display-scaling, Jul. 13, 2015. (Year: 2015).*
(Continued)

*Primary Examiner* — Nicholas R Wilson
(74) *Attorney, Agent, or Firm* — KED & Associates LLP

(57) ABSTRACT

The present invention relates to an electronic frame and an image displaying method of an electronic frame. The electronic frame according to one exemplary embodiment of the present invention detects, through an optical sensing unit, parts that are hidden by a frame, sets only a display area that is not hidden by the frame as a valid area, resizes an image so that the image matches the valid area of the display, and displays the image. Accordingly, even if the size of the frame is changed, a phenomenon in which a part of the image is not shown due to the frame could be prevented, as an image-resizing is adjustably performed.

17 Claims, 17 Drawing Sheets

(51) Int. Cl.
*G02F 1/1333* (2006.01)
*G06F 3/042* (2006.01)
*G06F 3/0484* (2013.01)
*G06F 3/147* (2006.01)
*G09G 3/20* (2006.01)

(52) U.S. Cl.
CPC ........ *G02F 1/133308* (2013.01); *G06F 3/042* (2013.01); *G06F 3/04845* (2013.01); *G06F 3/147* (2013.01); *G09G 3/20* (2013.01); *G02F 2001/13324* (2013.01); *G06F 2203/04806* (2013.01); *G09G 2340/0442* (2013.01); *G09G 2370/022* (2013.01); *G09G 2380/16* (2013.01)

(56) References Cited

U.S. PATENT DOCUMENTS

| | | | |
|---|---|---|---|
| 2013/0271352 A1* | 10/2013 | Wu | G09G 5/00 345/1.1 |
| 2014/0118317 A1 | 5/2014 | Song et al. | |
| 2015/0143287 A1 | 5/2015 | Khanahmadi | |

OTHER PUBLICATIONS

Bimber et al., "LumiConSense A Transparent, Flexible, and Sclaable Thin-Film Sensor", IEEE, 2014. (Year: 2014).*
International Search Report (with English Translation) dated Jun. 3, 2016 issued in Application No. PCT/KR2016/001776.

* cited by examiner

【Figure 1】
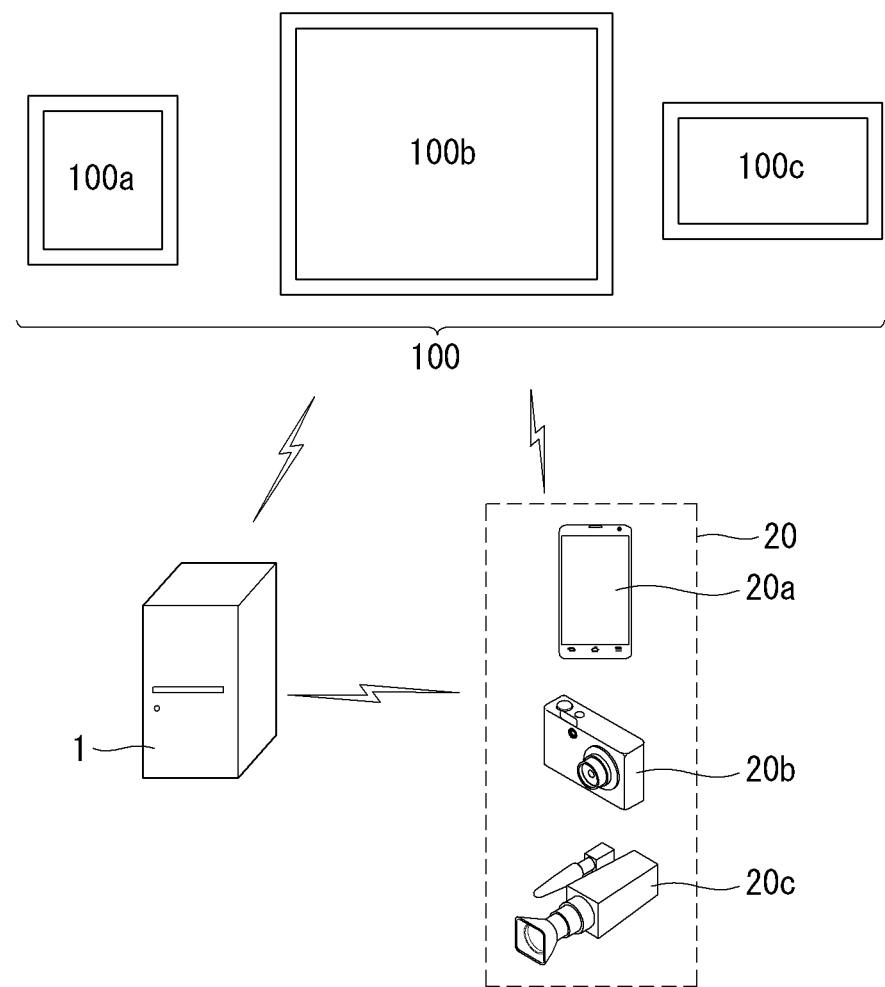

[Figure 2]
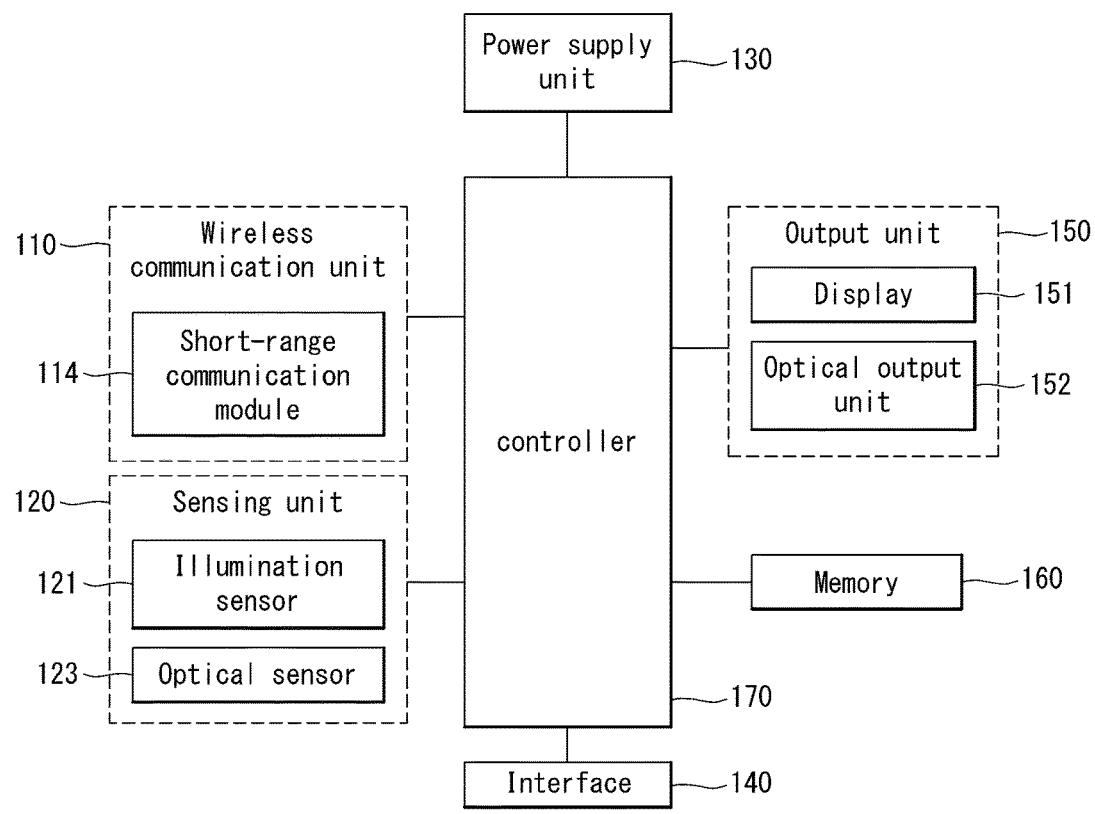

【Figure 3】
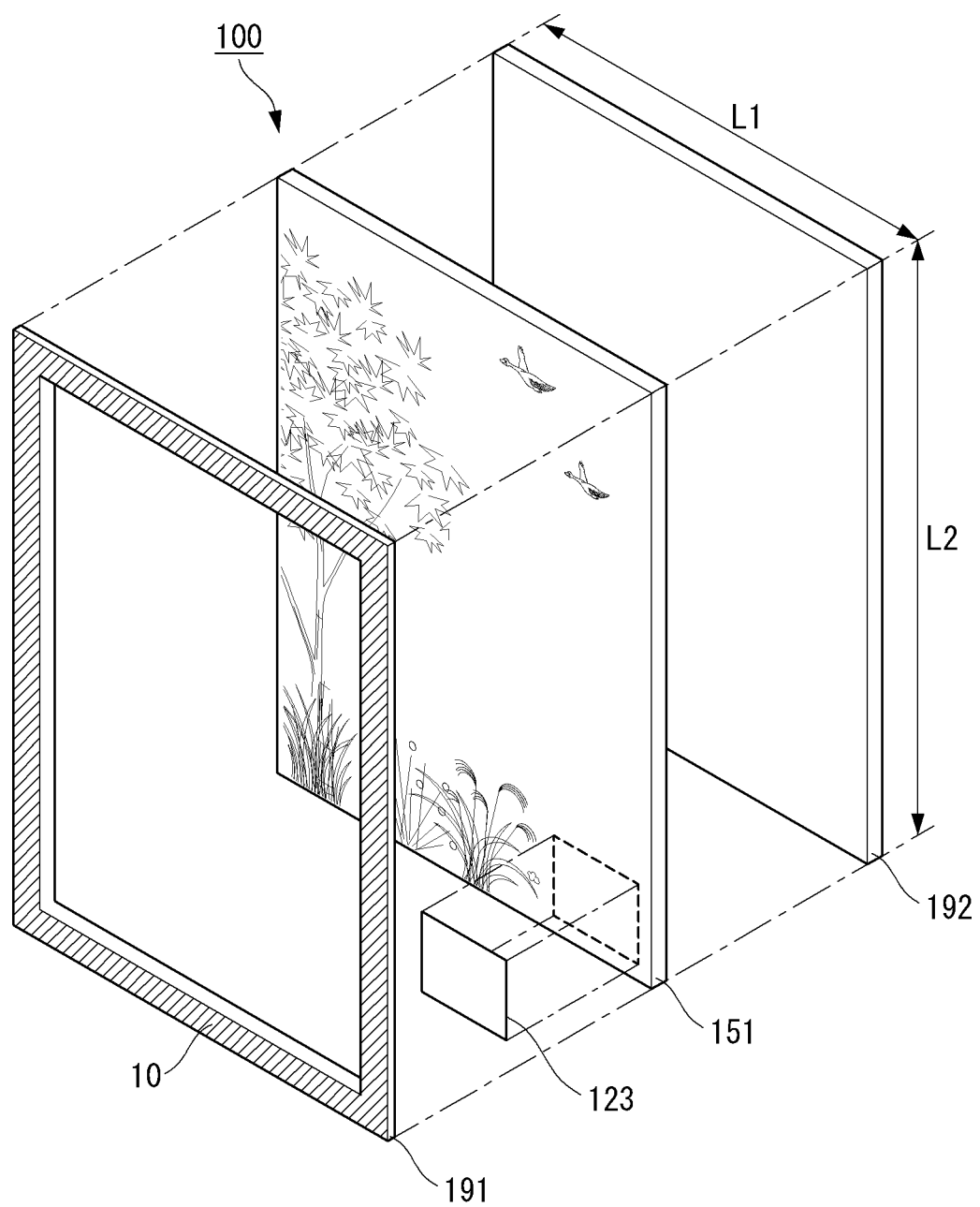

[Figure 4]
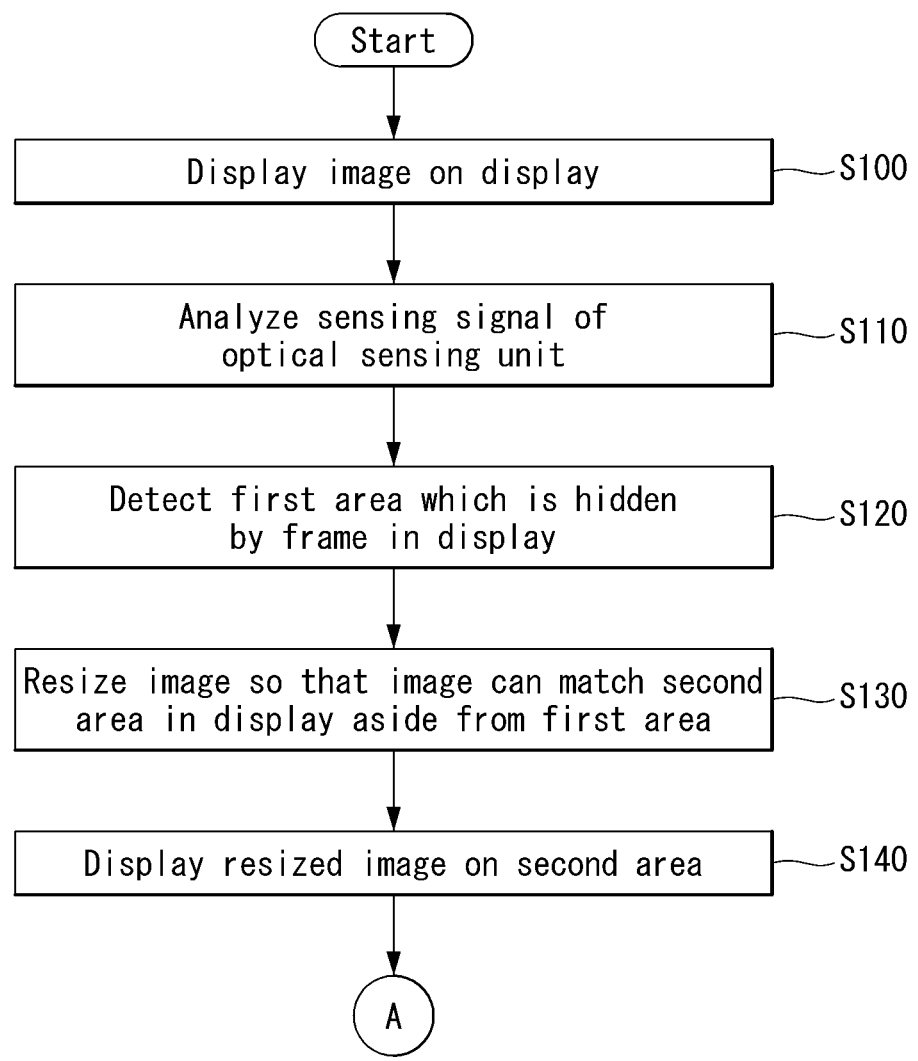

【Figure 5】
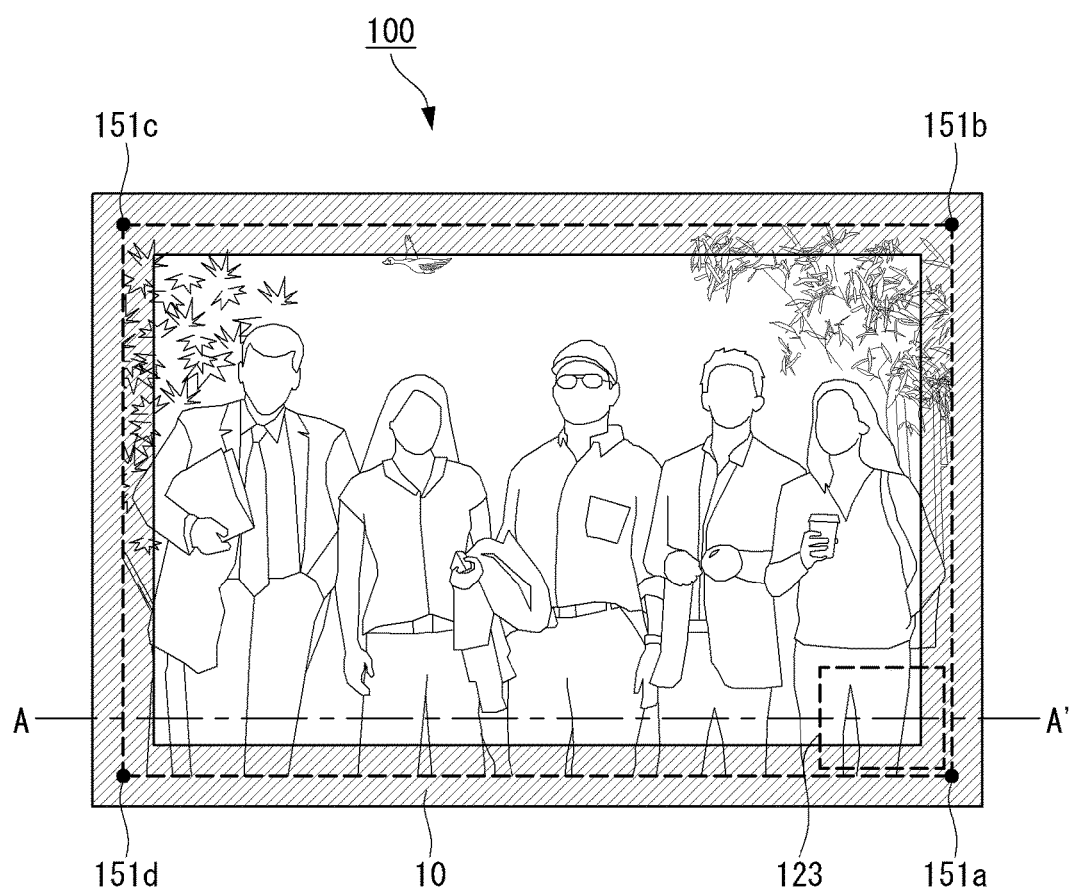

[Figure 6]
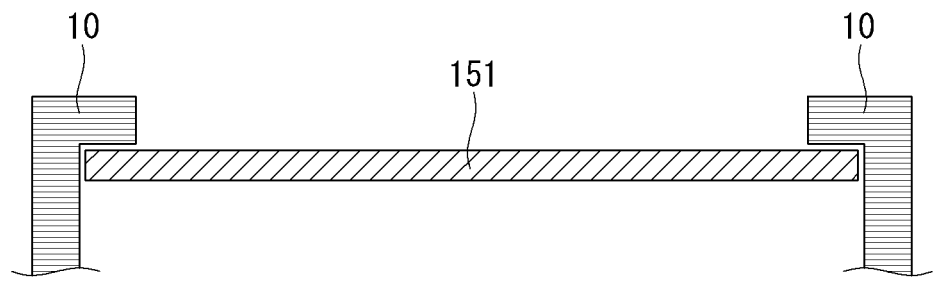

【Figure 7】
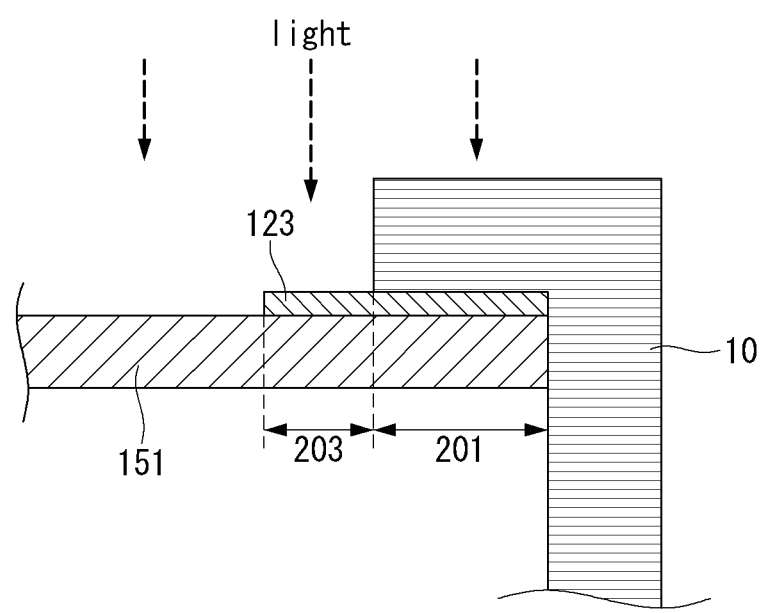

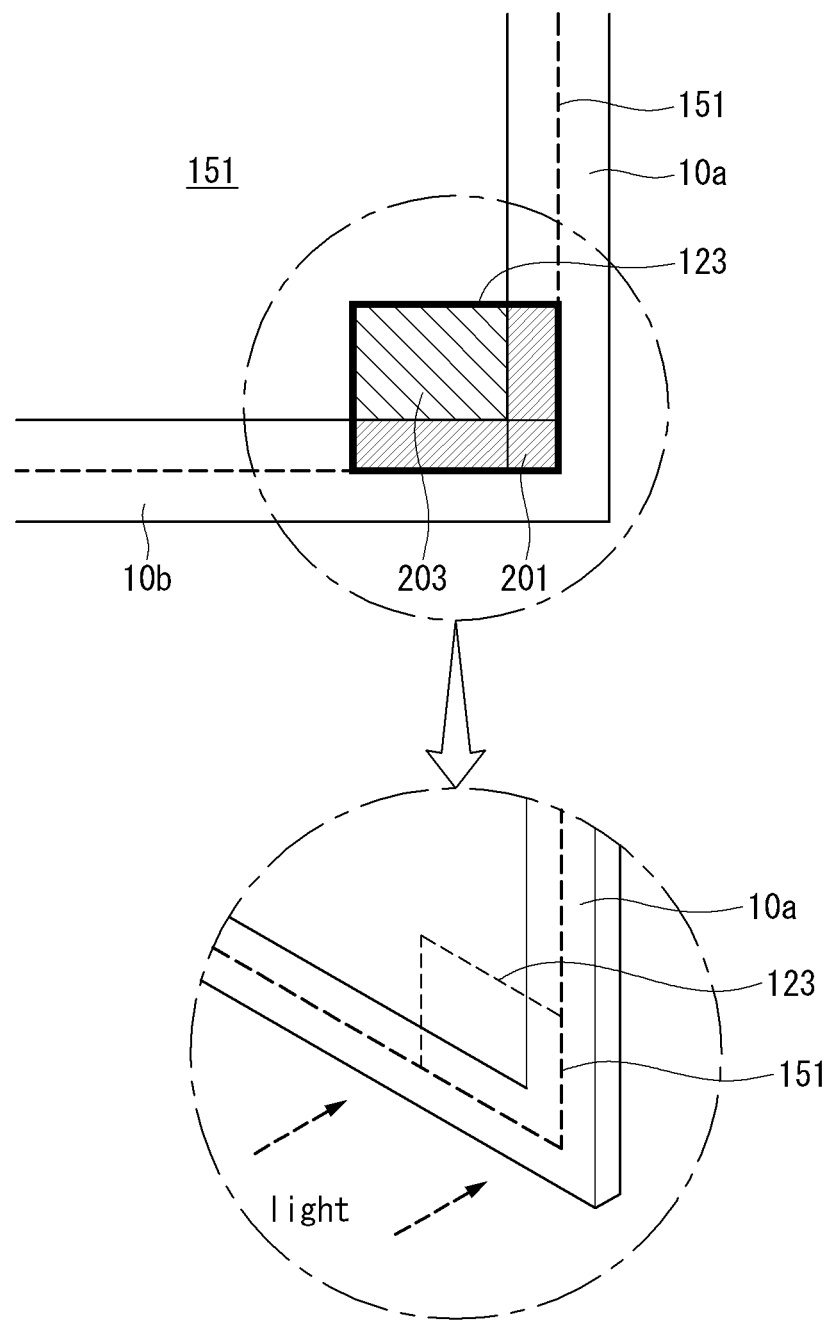
[Figure 8]

[Figure 9]
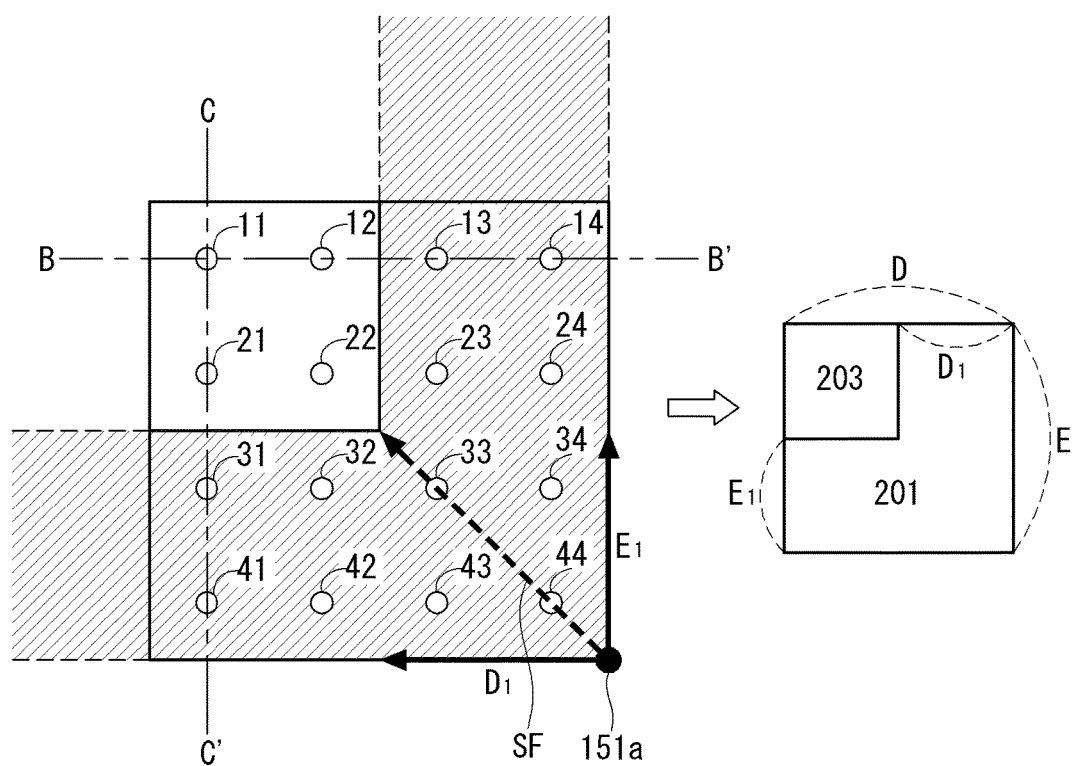

[Figure 10]
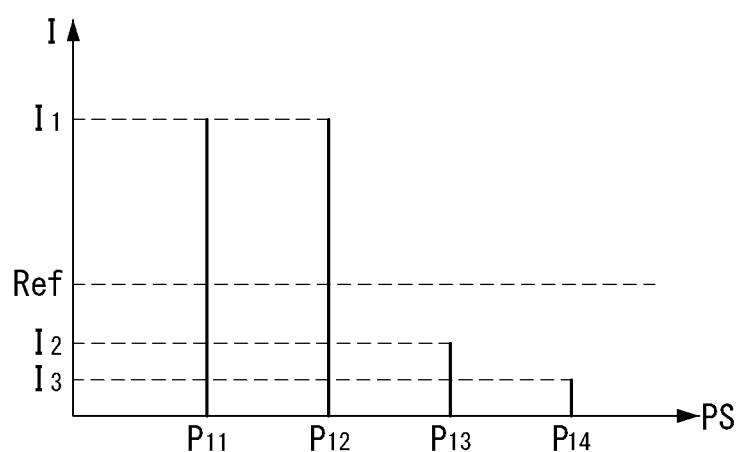

[Figure 11]
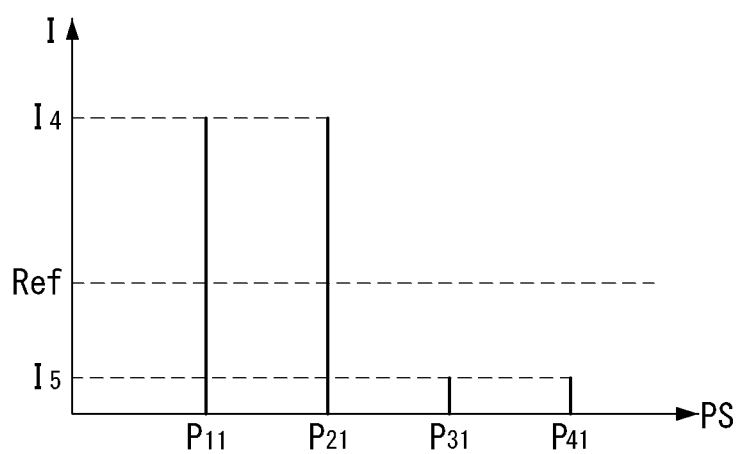

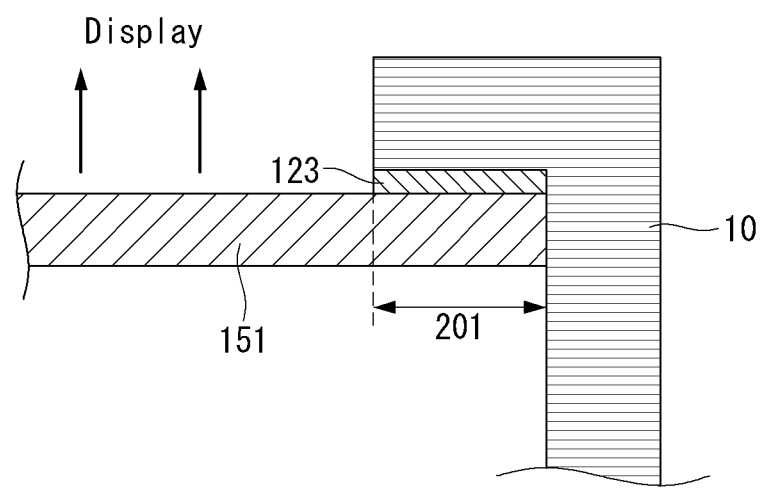
[Figure 12]

[Figure 13]
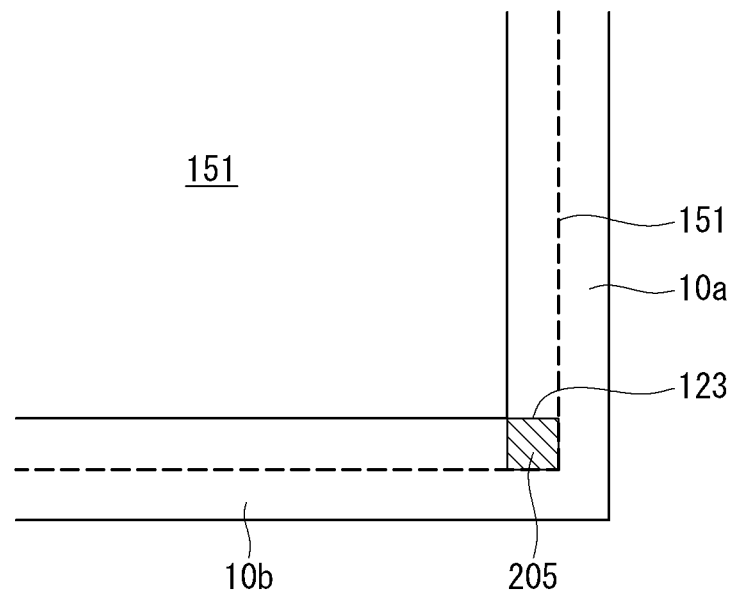
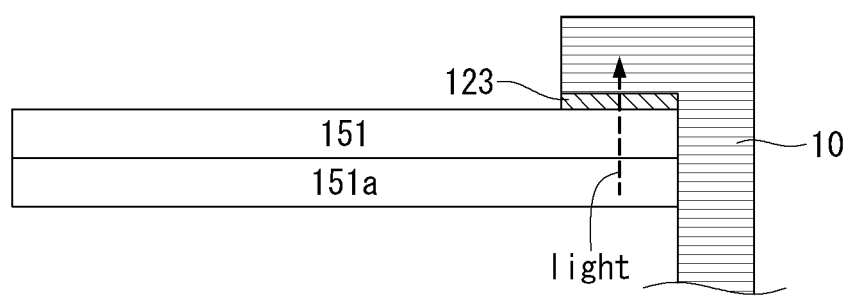

[Figure 14]
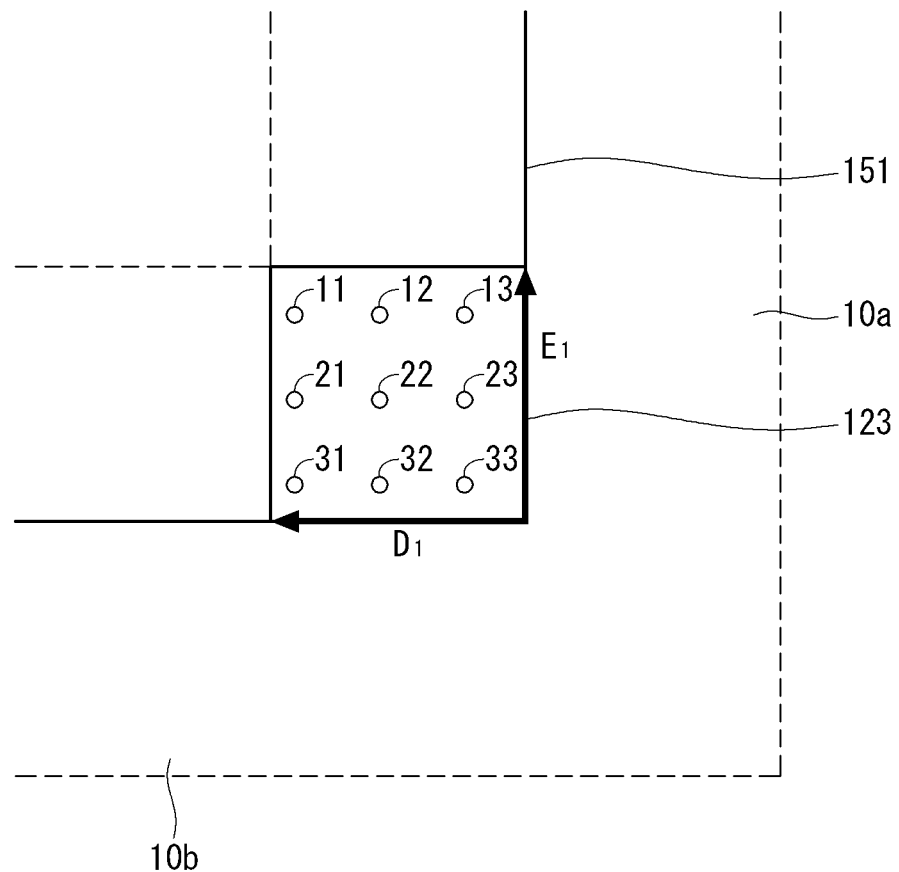

[Figure 15]
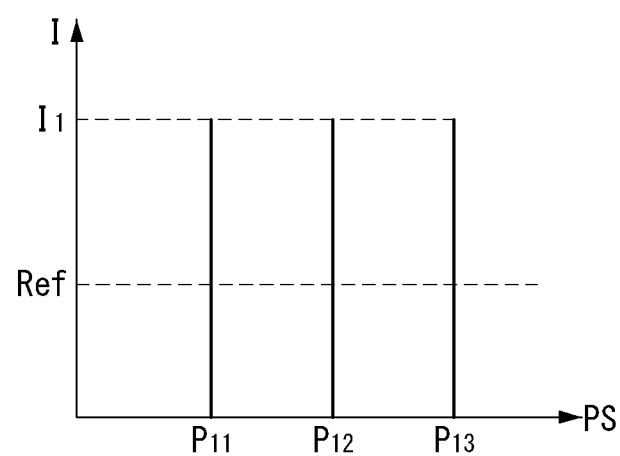

【Figure 16】
(a)
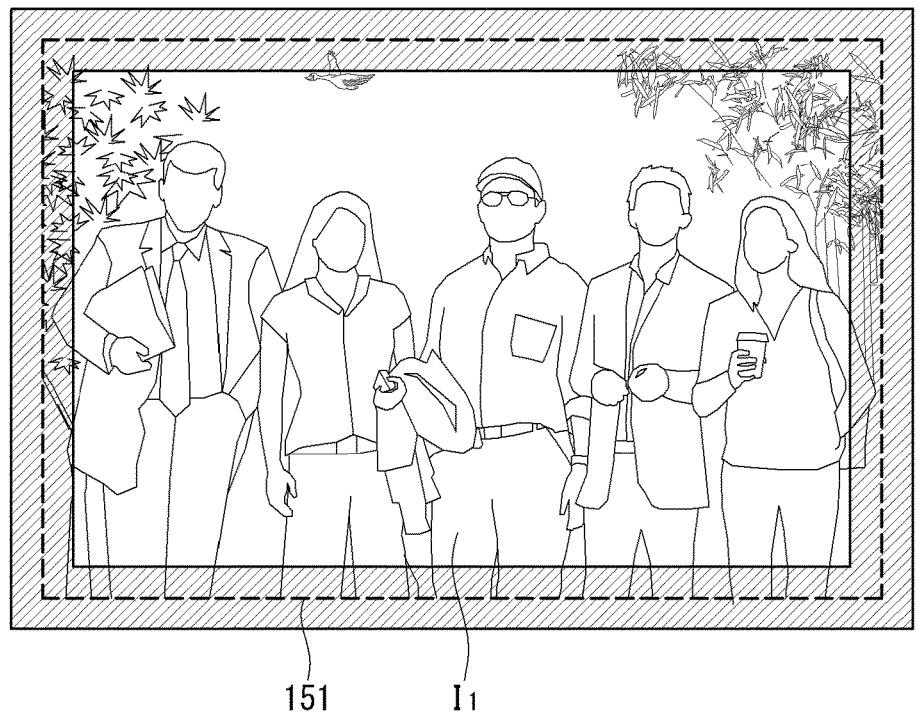
151  I₁
(b)
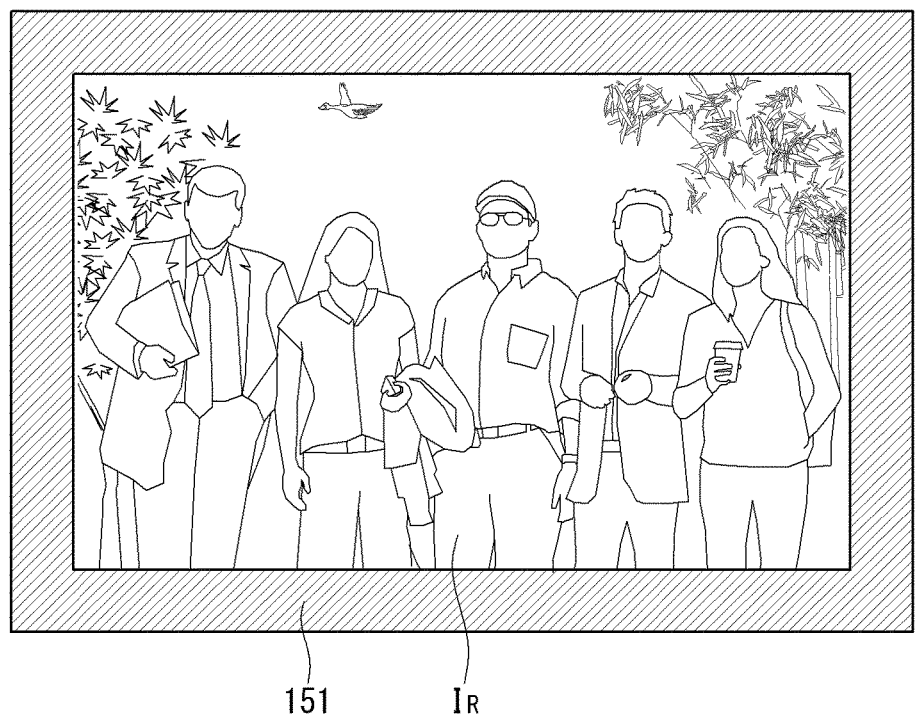
151  I_R

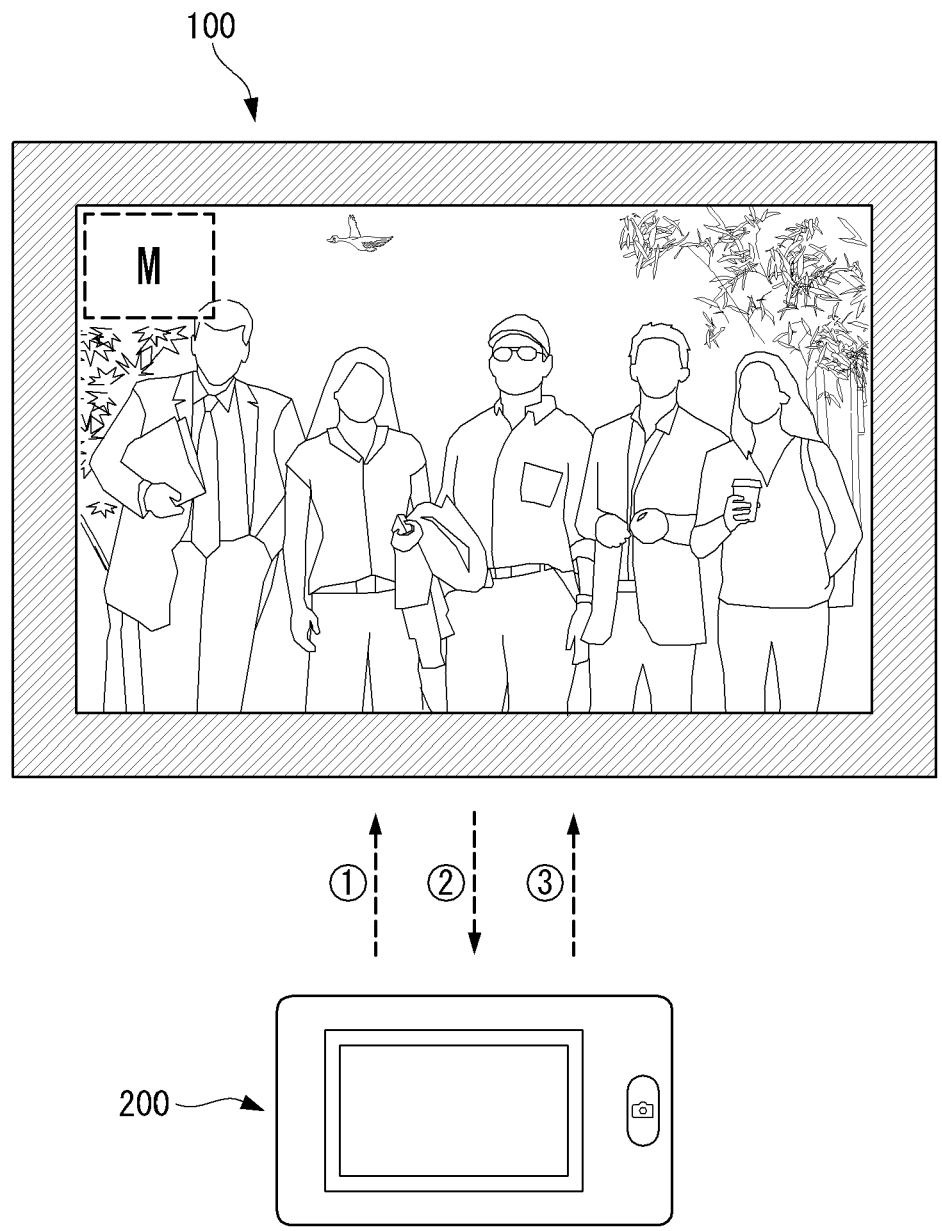
[Figure 17]

ELECTRONIC FRAME AND IMAGE DISPLAYING METHOD OF ELECTRONIC FRAME

CROSS-REFERENCE TO RELATED PATENT APPLICATIONS

This application is a U.S. National Stage Application under 35 U.S.C. § 371 of PCT Application No. PCT/KR2016/001776, filed Feb. 24, 2016, which claims priority to Korean Patent Application No. 10-2015-0102159, filed Jul. 20, 2015, whose entire disclosures are hereby incorporated by reference.

TECHNICAL FIELD

The present invention relates to an electronic frame and an image displaying method of electronic frame.

BACKGROUND ART

The electronic frame (digital photo frame) means an apparatus for displaying data of image photographed by a digital image photographing apparatus (for example, a digital camera, a mobile phone, etc.) on a liquid crystal display (LCD) or the like.

The electronic frame may provide the function of a frame or an album of a photograph regardless of the attributes of the image such as resolution and color.

The electronic frame may display an image read from an embedded memory card or an image received through a wired or wireless network such as the Internet.

On the other hand, the LCD of the electronic frame may have parts hidden by a frame. Accordingly, when the image is displayed according to the resolution of the LCD of the electronic frame, there is a problem that parts of the displayed image are hidden by the frame, so that the user is provided with a partially cut-out image.

Further, in the case of the electronic frame provided in an assembly type, various frames having different sizes (horizontal length and vertical length) may be used. Accordingly, when displaying an image corresponding to the resolution of the LCD, there is a problem that parts of the image hidden by the frame can also be changed according to the type of the frame.

Therefore, it has been required to develop an intuitive interface for setting, changing, and selecting image to be output, and it is necessary to meet the needs of users who want to use various electronic frames more conveniently.

DISCLOSURE

Technical Problem

The present invention is directed to solving the above-mentioned problems and other problems.

An object of the present invention is to automatically recognize the parts of the image hidden by the frame of the electronic frame when the image is displayed corresponding to the resolution of the display, thereby providing to the user without image which is hidden by the frame.

An object of the present invention is to automatically recognize the parts hidden by the frame and resize and display the image to an appropriate size, thereby adjusting parts where the image is displayed on the display to fit the size of the frame.

An object of the present invention is to automatically recognize an active area of the display corresponding to the size of the frame although the display size of the electronic frame is fixed and only the frame is changed and automatically adjust an area in which an image is displayed on the display.

Technical Solution

In an aspect of the present invention, an electronic frame includes a display for displaying an image; a frame supporting the display along an edge of the display; an optical sensor disposed at a position having an area where at least a part of the edge areas of the display overlap with the frame; and a controller configured to calculate a first area hidden by the frame in the display according to a sensing signal of the optical sensor, resize a size of the image to match a size of a second area in the display aside from the first area and display the resized image in the second area.

The optical sensor may include a transparent film sensor for detecting a current due to light transmission, and the transparent film sensor is attached to a vertex area in which a first edge and a second edge of the display intersect.

The vertex area to which the transparent film sensor is attached may include a crossing area in which a first frame supporting the first edge and a second frame supporting the second edge intersect, and a display area not hidden by the frame.

The controller may be configured to recognize, as the first area, an area where a current of a predetermined value or more is not detected due to the light is not transmitted by the frame; and recognize, as the second area, an area where a current of the predetermined value or more is detected due to the light transmission.

The vertex area to which the transparent film sensor is attached may be a crossing area in which a first frame supporting the first edge and a second frame supporting the second edge intersect.

The display may include a liquid crystal display (LCD), and the transparent film sensor may recognize, as the first area, an area through which light of a backlight unit of the liquid crystal display is transmitted when the image is displayed on the display.

The transparent film sensor may comprise a first transparent film sensor attached to a first vertex area in which the first edge and the second edge of the display intersect; and a second transparent film sensor attached to a second vertex area in which a third edge and a fourth edge of the display intersect.

The transparent film sensor may be a transparent photovoltaic film.

The electronic frame may further comprise a memory, wherein the controller may be configured to store a scale factor for resizing the image according to a size of the first area in a memory; resize the image to be displayed on the display based on the scale factor; and display the resized image on the second area.

The scale factor may be changed according to the size of the frame.

The controller may be configured to display a marker including information on the scale factor on the display with the image.

The electronic frame may further comprise a wireless communication unit, wherein the controller maybe configured to transmit the information on the scale factor to an external terminal through the wireless communication unit upon request of the external terminal; and receive the resized image based on the scale factor from the external terminal through the wireless communication unit.

The electronic frame may further comprise a wireless communication unit for receiving the image data, and wherein the image may be received from an external terminal through the wireless communication unit.

In another aspect of the present invention, an image displaying method of electronic frame includes displaying an image on a display; detecting a sensing signal of an optical sensor attached to an edge of the display; calculating a first area hidden by the frame in the display according to a sensing signal of the optical sensor; resizing a size of the image to match a size of a second area in the display aside from the first area; and displaying the resized image in the second area.

The calculating the first area may comprise setting a scale factor for resizing the image according to a size of the first area; and storing the scale factor in the memory.

The method may further comprise, when a second image which is a next image of a first image is displayed on the display after the first image displayed on the display is resized based on the scale factor, resizing the second image based on the scale factor; and displaying the second image on the second area.

Advantageous Effects

According to an embodiment of the present invention, the active area of the display can be automatically adjusted corresponding to the size of the frame.

Further, according to an embodiment of the present invention, the parts of the image hidden by the frame of the electronic frame is automatically recognized when the image is displayed corresponding to the resolution of the display, thereby providing to the user without the parts hidden by the frame.

Further, according to an embodiment of the present invention, the parts hidden by the frame are automatically recognized and the image is resized and displayed to an appropriate size, thereby adjusting parts where the image is displayed on the display to fit the size of the frame.

Further, according to an embodiment of the present invention, the active area of the display corresponding to the size of the frame is automatically recognized although the display size of the electronic frame is fixed and only the frame is changed and the area in which the image is displayed on the display is automatically adjusted.

BRIEF DESCRIPTION OF THE DRAWINGS

FIG. 1 schematically illustrates a system for explaining the operation of an electronic frame according to an embodiment of the present invention.

FIG. 2 is a block diagram of an electronic frame according to an embodiment of the present invention.

FIG. 3 is an exploded perspective view of an electronic frame body.

FIG. 4 is a flowchart of a method of displaying an image of an electronic frame according to an embodiment of the present invention.

FIG. 5 is a plan view of an electronic frame according to an embodiment of the present invention.

FIG. 6 is a cross-sectional view taken along the line A-A'

FIG. 7 is an enlarged view illustrating a state in which the transparent film sensor is attached.

FIG. 8 is a view for specifically explaining a first area 201 hidden by a frame and a second area 203 not hidden by a frame among the display areas.

FIGS. 9 to 11 are views for explaining a process of distinguishing the first region and the second region by an optical sensor.

FIGS. 12 to 13 are a cross-sectional view and a plan view for explaining a state in which an optical sensor is arranged according to another embodiment of the present invention.

FIGS. 14 to 15 are views for explaining another example of recognizing an area hidden by a frame, in accordance with the arrangement structure of the optical sensor disclosed in FIG. 12.

FIG. 16 is a view for explaining an example of displaying a resized image in consideration of an area hidden by a frame according to an embodiment of the present invention.

FIG. 17 is a view for explaining an example of displaying an image on an electronic frame according to another embodiment of the present invention.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

FIG. 1 schematically illustrates a system for explaining the operation of an electronic frame according to an embodiment of the present invention.

Referring to FIG. 1, the system may include an electronic frame 100 (100a, 100b, 100c), a server 1, and an image capturing device 20 (20a, 20b, 20c).

The server 1 may transmit image data to the electronic frame 100 through a wired/wireless network. The image data stored in the server 1 may be transmitted from the image capturing device 20 and transmitted from another electronic apparatus connected to the server 1.

The server 1 may manage accounts of a plurality of users. A plurality of users may include a user of the electronic frame 100. The server 100 may transmit the image data of the user of the electronic frame 100 to the electronic frame 100. The image data of the user may be image data associated with the account of the user of the electronic frame 100 of the server 1.

The server 1 may include a plurality of cloud servers providing cloud services. The image data of the server 1 may be image data uploaded to the account of the user of the electronic frame 100. The server 1 can provide an interface through which the image capturing device 20 can upload image data to the server 1 via a web or the like. The server 1 may provide an interface through which the electronic frame 100 can download image data from the server 1. The interface may be provided in the image capturing device 20 to upload image data to the server 1 or download image data from the server 1, through a interface operation of the user.

Meanwhile, according to an embodiment of the present invention, the server 1 may store information on a positional relationship between a plurality of electronic frames. The server (1) can transmit image data to a plurality of electronic frames based on the positional relationship between the plurality of electronic frames.

Meanwhile, according to an embodiment of the present invention, the server 1 may store frame size information and display size information of each of the plurality of electronic frames 100a, 100b, and 100c. For example, the display size of the first electronic frame 100a may be 5*7 inches, but the display size shown to the user, except for the area hidden by the frame supporting the display along the edges, may actually be smaller than 5*7 inches. In the case of the server 1 transmits the image to the first electronic frame 100a after storing a ratio information according to the display size and the frame size, the server 1 may resize the image based on the ratio. Accordingly, the first electronic frame 100a may display the resized image received from the server 1 without a separate image resizing process.

Frame size information and display size information of the second electronic frame 100b and the third electronic frame 100c may also be stored in the server 1. The server 1 may transmit the image to each electronic frame after the image resizing process by varying the ratio according to the size of the frame and the display size, even if the same image is used.

As described above, the server 1 may transmit the resized image to the electronic frame, but an embodiment described in the following specific drawings relates to the electronic frame itself resizes and displays the image so that the area hidden by the frame, does not exist.

The image capturing device 20 is an apparatus for generating image data. The image capturing device 20 can generate image data including a subject by photographing the subject using a camera.

The image capturing device 20 may include a mobile terminal 20a, a digital camera 20b, a camcorder 20c, and the like.

The image capturing device 20 may store information on the positional relationship among the plurality of electronic frames. The image capturing device 20 may transmit an image photographed to the plurality of electronic frames so as to be displayed based on the positional relationship between the plurality of electronic frames.

Meanwhile, the image capturing device 20 may get the information on the positional relationship among the plurality of electronic frames and transmit the information to the server 1. When the server 1 transmits the image to the electronic frame 100, the server 1 may transmit the image based on the information on the positional relationship.

When the image capturing device 20 transmits image data to the electronic frame 100, the image capturing device 20 may transmit the same image data to the server 1. That is, the server 1, the image capturing device 20, and the electronic frame 100 may perform data synchronization between data transmission and reception.

FIG. 2 is a block diagram of an electronic frame according to an embodiment of the present invention.

Referring to FIG. 2, the electronic frame 100 is shown having components such as a wireless communication unit 110, a sensing unit 120, a power supply unit 130, an interface 140, an output unit 150, a memory 160, and a controller 170. It is understood that implementing all of the illustrated components is not a requirement, and that greater or fewer components may alternatively be implemented.

Specifically, the wireless communication unit 110 may include one or more modules for enabling wireless communication between the electronic frame 100 and the wireless communication system, between the electronic frame 100 and the server 1, or between the electronic frame 100 and the image capturing device 20. Further, the wireless communication unit 110 may include one or more modules that connect the electronic frame 100 to one or more networks.

According to an embodiment of the present invention, the electronic frame 100 may perform data communication with the server 1 and/or the image capturing device 20 through the wireless communication unit 110. That is, the electronic frame 100 may transmit information on the positional relationship among the plurality of electronic frames to the server 1 and/or the image capturing device 20, and receive the image from the server 1 and/or the image capturing device 20, and display the image.

The wireless communication unit 110 may include a short-range communication module 114. The short-range communication module 114 may sense (or recognize), Around the first electronic frame (100a in FIG. 1), a second electronic frame (100b in FIG. 1) and a third electronic frame (10c in FIG. 1) capable of communicating with the first electronic frame 100a. Further, the controller 170 may receive the position information of the second electronic frame 100b and the third electronic frame 100c through the short-distance communication module 111.

The controller 170 may sense the distances of the second electronic frame 100b and the third electronic frame 100c from the first electronic frame 100a based on the intensity of the signal received through the short distance communication module. When the first electronic frame 100a is connected to the second electronic frame 100b and the third electronic frame 100c via the short-range communication module, the controller 170 may receive the frame size (Length*Width) of the second electronic frame 100b and the frame size (Length*Width) of the third electronic frame 100c from the second electronic frame 100b. Accordingly, the first electronic frame 100a may confirm information on the positional relationship between the first electronic frame 100a and other electronic frames in the vicinity.

The first electronic frame 100a may share the information on the positional relationship among the electronic frames with the second electronic frame 100b, the third electronic frame 100c, the server 1, and the image capturing device 20.

The sensor 120 may include at least one sensor for sensing at least one of information in the electronic frame 100, surrounding information surrounding the electronic frame, and user information. According to an embodiment of the present invention, the sensor 120 may include an illumination sensor 121 and a optical sensor 123.

The illumination sensor 121 is provided in a part of the frame of the electronic frame 100 to measure the ambient brightness of the electronic frame 100. According to an exemplary embodiment of the present invention, the controller 170 may control the brightness characteristics of the image displayed on the electronic frame 100 based on the value sensed through the illumination sensor 121.

The optical sensor 123 may sense light incident on a front glass side of the display or sense light emitted from the pixel of the display itself.

All displays have a layer that arranges pixels representing the brightness and color in a matrix structure and forms a display area, and a front glass for protecting the layer. The front glass may be integrated with the layer.

The optical sensor 123 may be attached to a part of the display front surface (front glass) in the form of a transparent film. The feature, which is automatically recognized the area hidden by the frame through the transparent film type optical sensor attached to the display front surface, will be described in detail with reference to FIGS. 5 to 15.

A method for resizing the image through the optical sensor will be described in detail reference to FIGS. 5 to 11. Another method for resizing the image through the optical sensor will be described in detail reference to FIGS. 12 to 15.

The optical sensing unit 123 may be disposed on the front glass or on the front or rear surface of the layer so as to correspond to the matrix arrangement matched an arbitrary area of the display. Although not shown, the optical sensor 123 may include a sensing detection unit (not shown) and an effective data processing unit (not shown). The sensing detection unit recognizes the position on the matrix array of the optical sensor for performing the sensing operation when the sensing signal is generated according to the sensing operation of the incoming light. The effective data processing unit electrically converts the intensity of the light sensing signal when the sensing signal is generated according to a sensing operation of the incident light in the optical sensor 123 and compares the intensity of the sensing signal with the intensity of a predetermined reference signal to determine the validity of the sensing operation.

The power supply unit 130 receives external power and internal power under the control of the controller 170 and supplies power required for operation of the respective components. The power supply unit 130 may include a battery, and the battery may be configured to be embedded in the terminal body, or configured to be detachable from the electronic frame 100 for recharging. The power supply unit 130 may include a connection port. The connection port may be configured as one example of the interface 140 to which an external charger for supplying power to recharge the battery is electrically connected.

Meanwhile, according to an embodiment of the present invention, when the connection port meet a certain condition, it can be charged by being drawn out from the body of the electronic frame 100 and engaging with a charging station.

For example, the charging station may be located at the bottom of the living room, and the electronic frame 100 may be spaced a certain distance from the charging station and mounted on the living room wall. When the living room lighting is perceived to be dark, the connection port can be drawn out from the electronic frame 100 toward the charging station to be engaged with the charging station. When the charging of the power supply unit 130 is completed, the connection port can be separated from the charging station and can be drawn into the body of the electronic frame 100.

Meanwhile, the connection port of the power supply unit may be connected to another electronic frame in the vicinity.

As another example, the power supply unit 130 may be configured to recharge the battery in a wireless manner without use of the connection port. In this example, the power supply unit 130 can receive power, transferred from an external wireless power transmitter, using at least one of an inductive coupling method which is based on magnetic induction or a magnetic resonance coupling method which is based on electromagnetic resonance.

The interface 140 may serve as a path allowing the electronic frame 100 to interface with external devices. For example, the interface 140 may include at least one of an external charger port, a wired/wireless data port, a memory card, and a port for connecting a device having an identification module. The electronic frame 100 may be controlled through the external device connected to the interface 130. The external device may include the server 1, the image capturing device 20, and the like described with reference to FIG. 1.

The output unit 150 may include at least one of a display 151 and an optical output module 152 so as to generate output related to vision, audio, etc.

The display unit 151 may include at least one of a liquid crystal display (LCD), a thin film transistor-liquid crystal display (TFT LCD), an organic light-emitting diode (OLED), a flexible display, a three-dimensional display (3D display) and an electronic ink display (e-ink display).

Meanwhile, the display unit 151 of the electronic frame 100 according to an embodiment of the present invention may include a touch sensor that senses a touch to the display unit 151 in order to receive a control command by the touch.

Further, the display 151 may restrict a user's input through the display unit 151 to stick to the function of the image display of the electronic frame 100. That is, the display unit 151 may not include a touch sensor.

The optical output module 152 is configured to output light for notifying the occurrence of an event. For example, the event may include a case where the image data is received from the server 1 or the image capturing device 20, a case where the positional relationship information is shared with neighboring electronic frames, and a case where the battery charging is required, and the like. The controller 170 may control the optical output module 152 to terminate the output of light when an event confirmation of the user is detected.

The memory 160 can store programs to support operations of the controller 170 and store input/output data (for example, image data) temporarily.

The memory 160 stores data supporting the function of the electronic frame. The memory 160 may store an application program driven by the electronic frame 100 (an application program or an application), data for operation of the electronic frame 100, and instructions. At least some of these applications may be downloaded from an external server via wireless communication.

The memory 160 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like.

The controller 170 controls at least some of the components of the electronic frame 100 to control the operation of the electronic frame 100 as a whole. Further, the controller 170 may control any one or a combination of the above-described components in order to implement various embodiments described below on the electronic frame 100 according to the present invention.

FIG. 3 is an exploded perspective view of an electronic frame body.

Referring to FIG. 3, the electronic frame 100 may include a front body 191, a rear body 192, and a display 151 disposed between the front body 191 and the rear body 192.

The front body 191, as the frame 10 of the electronic frame that supports the display 151 at the front of the display 151, is combined with the display 151 to cover the edge of the display 151.

The display unit 151 may include at least one of a liquid crystal display (LCD), a thin film transistor-liquid crystal display (TFT LCD), an organic light-emitting diode (OLED), a flexible display, a three-dimensional display (3D display) and an electronic ink display (e-ink display).

The display unit 151 may include a touch sensor that senses a touch to the display unit 151 in order to receive a control command by the touch.

Meanwhile, the display 151 may restrict a user's input through the display unit 151 to stick to the function of the image display of the electronic frame 100. That is, the display unit 151 may not include a touch sensor.

The rear body 192 is a unit for supporting the display 151 from the rear face, and an internal space for accommodating various electronic components may be provided. The rear body 192 may further include a bracket coupling part (not shown) which is coupled with a predetermined bracket provided on a wall to mount the electronic frame 100 on the wall.

As described above, the body of the electronic frame 100 is divided into the front body 191 and the rear body 192. Hereinafter, a front body 191 supporting the front of the display 151, particularly, the frame 10 covering the edge of the display 151 will be regarded as the same as the front body 191.

The body size of the electronic frame 100 can be determined by the width L1 and the length L2. For example, the body size may be set to 5*7 inches, 8*10 inches, or to cover 23 inches liquid crystal display.

In FIG. 3, the sizes of the frame 10 and the display 151 are configured to be the same, but the present invention is not limited thereto. For example, since the display 151 must be supported by the frame, the size of the display 151 may be smaller than the size of the frame 10. For example, the width and length of the display 151 may be smaller than the width and length of the frame 10.

Meanwhile, the optical sensor 123 may be attached to the front surface of the display 151 and disposed between the display 151 and the frame 10. The optical sensor 123 may be disposed at a vertex area where the first edge and the second edge of the display 151 intersect. The display 151 in the form of a rectangle or a square has four vertex regions, and the optical sensor 123, of the four vertex areas, may be arranged in one vertex area or two vertex areas opposed in a diagonal direction.

The number or position of the optical sensor 123 may be appropriately changed in consideration of the size and shape of the electronic frame 100 and the processing capability of the processor, and the like.

Hereinafter, a specific example in which image data displayed on the display of the electronic frame according to an embodiment of the present invention is resized in consideration of parts hidden by the frame will be described.

FIG. 4 is a flowchart of a method of displaying an image of an electronic frame according to an embodiment of the present invention.

The method of displaying an image of an electronic frame according to an embodiment of the present invention can be implemented in the electronic frame 100 described with reference to FIGS. 1 to 3. Hereinafter, an image displaying method of electronic frame according to an embodiment of the present invention and an operation of the electronic frame 100 for implementing the method will be described in detail with reference to necessary drawings.

Referring to FIG. 4, the controller 170 of the electronic frame 100 may display an image on the display 151 (S100).

The image displayed on the display 151 may be an image stored in the memory 160 or an image received from an external device through the wireless communication unit 110. The image displayed on the display 151 may be displayed corresponding to the size of the display 151.

The controller 170 may analyze a sensing signal of the optical sensor (S110).

The optical sensor may be disposed at a position where at least a part of the edge of the display 151 has an area overlapping the frame.

The controller 170 may analyze the sensing signal of the optical sensor to detect a first area hidden by the frame of the display 151 (S120).

Since the front face of the display 151 must be supported by the frame, some of the areas where the image can be displayed on the display 151 may be hidden by the frame. The display 151 may include a bezel area. However, when the frame covers the bezel area, some of the effective areas where the image is actually displayed may be hidden by the frame.

The optical sensor recognizes the area where the displayed digital image is covered by the frame, with the digital image displayed in the effective area of the display. The optical sensor can detect a current due to light transmission. Hereinafter, an area of the display 151 of the electronic frame 100 where the digital image can be displayed may be referred to as an effective area of the display.

The incident light may be natural light that is introduced from the front surface of the electronic frame 100 while the electronic frame is hung on the wall.

The controller 170 may recognize, as the second area, an area where a current of the predetermined value or more is detected due to the light transmission. That is, the second area may be defined as an area of the display 151 that is not hidden by the frame among valid areas in which the image can be displayed.

The controller 170 may recognize, as the first area, an area where a current of a predetermined value or more is not detected due to the light is not transmitted by the frame. That is, the first area may be defined as an area of the display 151 that is hidden by the frame among the valid areas in which the image can be displayed.

Further, the incident light may be light by a backlight unit irradiated from the rear surface of the display 151 in a state that a digital image is displayed. In this case, the optical sensor attached to the front surface of the display 151 can detect the light irradiated from the rear surface of the display 151 due to the display of the digital image, and can distinguish a region where a current value of a predetermined threshold value or more is detected.

In the embodiment of the present invention, it will be explained in advance that the arrangement structure of the optical sensors is differently described according to the type of light introduced into the optical sensor.

For example, the optical sensor may be a sensor in the form of a transparent film. When the incident light is natural light, an area of the display to which the transparent film sensor is attached may include a crossing area in which a first frame supporting the first edge and a second frame supporting the second edge intersect, and a display area not hidden by the frame.

Further, for example, when the incident light on the optical sensor is light by a backlight unit irradiated from the rear surface of the display 151, the transparent film sensor is disposed in an area of the same size as intersecting area where the first frame supporting the first corner of the display 151 and a second frame supporting the second corner intersect.

According to the sensing signal analysis of the optical sensor, the controller 170 can distinguish the first area hidden by the frame in the effective display area and the second area aside from the first area.

The controller 170 of the electronic frame 100 may resize the image so that the size of the image displayed in the effective region including the first region and the second region matches the second region in operation S130. The process of S130 may be performed by the controller 170 or an image scaler provided as a module independent of the controller 170.

The controller 170 can display the resized image in the second area (S140).

FIG. 5 is a plan view of an electronic frame according to an embodiment of the present invention. FIG. 6 is a cross-sectional view taken along the line A-A'. FIG. 7 is an enlarged view illustrating a state in which the transparent film sensor is attached. FIG. 8 is a view for specifically explaining a first area 201 hidden by a frame and a second area 203 not hidden by a frame among the display areas.

Referring to FIG. 5, the size of the display 151 of the electronic frame 100 may be determined by four vertexes 151a, 151b, 151c, and 151d. The display 151 has the four edges and may have a structure in which at least a part of each edge is hidden by the frame 10 so that the front face of the display 151 is supported by the frame.

That is, referring to FIG. 6, the longitudinal edges of the display 151 are held by an L-shaped frame. As a result, the display 151 can be divided into an area (first area) hidden by the frame and an area (second area) not hidden by the frame.

Referring again to FIG. 5, a valid area in which the digital image can be displayed in the display 151 may be a range determined by the four vertexes 151a, 151b, 151c, and 151d.

The transparent film sensor 123 may be attached to the first vertex 151a of the four vertices 151a, 151b, 151c, and 151d. The transparent film sensor 123 may have a rectangular shape, and may be attached to correspond to the first vertex in order to recognize at which point of the display 151 an area where a current of a predetermined threshold value or more is detected due to the light inflow on the transparent film sensor 123.

In FIG. 5, the size of the display 151 is shorter than the width and length of the frame. However, the present invention is not limited thereto. That is, the display 151 applied to the embodiment of the present invention may be equal to the size of the frame.

Referring to FIG. 7, the optical sensor 123 is disposed between the front surface of the display 151 and the frame 10. The area occupied by the optical sensor 123 of the display 151 may include an area 201 overlapped with the frame and a non-overlapping area 203.

Referring to FIG. 8, the transparent film sensor 123 may include a crossing area 201 (which may correspond to the first area) in which a first frame 10a supporting the first edge and a second frame 10b supporting the second edge intersect, and a display area 203 (which may correspond to the second area) not hidden by the frame. In FIG. 8, the light detected by the optical sensor 123 may be natural light introduced from the front surface of the display 151.

The arrangement structure of the frame 10, the display 151, and the optical sensor 123 has been described above with reference to FIGS. 5 to 7. A process of recognizing parts hidden by the frame in the effective area of the display according to the structure of the electronic frame of FIGS. 5 to 7 will be described in more detail with reference to FIGS. 9 to 11.

FIGS. 9 to 11 are views for explaining a process of distinguishing the first region and the second region by an optical sensor.

Referring to FIG. 9, the rectangular optical sensor 123 may include a plurality of sensing units 11, 12, . . . , 43, 44 arranged at constant spacing. The positions where the respective sensing units 11, 12, . . . , 43, 44 are disposed may correspond to the pixel positions of the display 151. Thus, the constant spacing may be the spacing between the pixels of the display 151.

When natural light enters the display 151 in the state that a digital image is displayed, the sensing units of the first group 11, 12, 21, 22 are group exposed by natural light, and the sensing unit of the second group (13, 14, 23, 24, 31, 32, 33, 34, 41, 42, 43, 44) is blocked the natural light by the frame.

Referring to FIG. 10, a process of recognizing a region hidden by a frame based on the sensing result of the sensing units 11, 12, 13, and 14 disposed on a line B-B' in FIG. 9 will be described.

In the case of the sensing units 11 and 12 included in the first group among the sensing units (11, 12, 13, 14) arranged on the line B-B', the current value I1 equal to or greater than the threshold value Ref can be output. On the other hand, in the case of the sensing units 12 and 13 included in the second group among the sensing units 11, 12, 13 and 14 arranged on the line B-B', the current values I2 and I3 less than the threshold value Ref can be output.

The controller 170 analyzes the result of the sensing signal. The controller 170 recognizes the length D1 corresponding to the sensing units 13 and 14 included in the second group among the sensing units 11, 12, 13, and 14 disposed on the line B-B' as the width hidden by the frame.

Referring to FIG. 11, a process of recognizing a region hidden by a frame based on the sensing result of the sensing units 11, 21, 31, and 41 disposed on a line C-C' in FIG. 9 will be described.

In the case of the sensing units 11 and 21 included in the first group among the sensing units (11, 21, 31, 41) arranged on the line C-C', the current value I4 equal to or greater than the threshold value Ref can be output. On the other hand, in the case of the sensing units 31 and 41 included in the second group among the sensing units 11, 21, 31, 41 arranged on the line C-C', the current values I5 less than the threshold value Ref can be output.

The controller 170 analyzes the result of the sensing signal. The controller 170 recognizes the length E1 corresponding to the sensing units 31 and 41 included in the second group among the sensing units 11, 21, 31, and 41 disposed on the line C-C' as the length hidden by the frame.

Accordingly, the controller 170 uses the first vertex 151a of the display 151 as a reference point and the width D1 and the length E1 as vector components. The controller 170 calculates the size of the vector (SF) by the vector component D1 and a vector component E1 in the scale factor.

The controller 170 may reduce the image by applying the scale factor SF to the previously displayed image using the first vertex 151a as a reference point.

Meanwhile, The controller 170 may also apply the scale factor SF calculated for the first vertex 151a to the remaining vertexes of the display 151 to perform an image resizing process using the same scale factor for the entire image.

Meanwhile, in the above-described example, a process of image resizing through processing of vector components has been described, but the present invention is not limited thereto.

FIGS. 12 to 13 are a cross-sectional view and a plan view for explaining a state in which an optical sensor is arranged according to another embodiment of the present invention.

Referring to FIG. 12, the optical sensor 123 is disposed between the front surface of the display 151 and the frame 10. The area occupied by the optical sensor 123 of the display 151 may be an area 201 overlapped with the frame Referring to FIG. 13, The optical sensor 123 may be attached to a vertex area of the display 151. The vertex area to which the optical sensor 123 may be an area 205 overlapping the display area among the areas where the first frame 10a supporting the first edge of the display 151 and the second frame 10b supporting the second edge intersect.

The display 151 may include a liquid crystal display (LCD). The controller 170 can recognize the area into which the light of the backlight unit 151a of the liquid crystal display is incident as the first area 205 hidden by the frame of the display 151.

FIGS. 14 to 15 are views for explaining another example of recognizing an area hidden by a frame, in accordance with the arrangement structure of the optical sensor disclosed in FIG. 12.

Referring to FIG. 14, the rectangular optical sensor 123 may include a plurality of sensing units 11, 12, . . . , 32, 33 arranged at constant spacing. The positions where the respective sensing units 11, 12, . . . , 32, 33 are disposed may correspond to the pixel positions of the display 151. Thus, the constant spacing may be the spacing between the pixels of the display 151.

When light (light of a display pixel) is incident on the display 151 by the backlight unit, all the plurality of sensing units 11, 12, . . . , 32, 33 can output a predetermined current value by the incident light.

Referring to FIG. 15, The sensing result of each of the sensing units 11, 12, 13 outputs the current value T1 exceeding the threshold Ref reference value. The length D1 occupied by each sensing unit 11, 12, 13 recognizes as a width hidden by the frame. The same applies to the length.

That is, when viewed from the front of the electronic frame 100, all the plurality of sensing units (11, 12, . . . , 32, 33) are parts hidden by the frames. The sensing unit outputs effective sensing data since light due to the display pixels is input. Accordingly, the controller 170 can perform image resizing through the processing of the vector components described with reference to FIG. 9.

Referring to FIGS. 5 to 11 and FIGS. 12 to 15, the electronic frame 100 according to an embodiment of the present invention is configured to distinguish area hidden by a frame through the transparent film sensor attached to the front surface of the display and display the image corresponding to the size of the area hidden by the frame among the valid area of the display.

FIG. 16 is a view for explaining an example of displaying a resized image in consideration of an area hidden by a frame according to an embodiment of the present invention.

Referring to FIG. 16, (a) is an exemplary screen in which the first image I1 is displayed on the display 151 of the electronic frame 100 before the image resizing process according to an embodiment of the present invention is performed. (b) is a result IR in which the image resizing process described in the above-described example is performed on the first image I1. The result IR means that the complete image containing the parts that was hidden by the frame and not visible is displayed in the valid area of the display.

Meanwhile, the electronic frame 100 according to an embodiment of the present invention may store the scale factors SF calculated in the processes of FIGS. 5 to 11 and 12 to 15 in the memory 160.

Accordingly, the controller 170 can apply the stored scale factor (SF) collectively to the images displayed thereafter to perform the image resizing process. That is, a processing of the sensing signal of the optical sensor to calculate an additional scale factor is unnecessary. Once the scale factor (SF) is calculated, the image resizing algorithm by the corresponding scale factor may be applied to all images displayed subsequently.

FIG. 17 is a view for explaining an example of displaying an image on an electronic frame according to another embodiment of the present invention.

The electronic frame 100 according to an embodiment of the present invention may display a marker M including the information on the scale factor SF on the display 151 together with the resized image.

The electronic frame 100 receives the image from an external terminal through the wireless communication unit 110 and displays it on the display 151. Therefore, in case of the external device stores the scale factor information, when the external device transmits the image data to the electronic frame 100, the image resizing result based on the scale factor information is transmitted to the electronic frame 100. The electronic frame 100 can display a complete image without parts hidden by the frame, even if the electronic frame 100 displays the received image on the display 151 without any image resizing.

The marker may be provided in the form of a QR code.

Referring to FIG. 17, the external mobile terminal 200 can photograph the electronic frame 100 by a camera. The external mobile terminal 200 can request information included in the marker on the electronic frame 100 while photographing the electronic frame 100 (1). The electronic frame 100 can transmit the marker information including information on the scale factor to the external mobile terminal 200 at the request of the external mobile terminal 200 (2). The external mobile terminal 200 receiving the scale factor information may perform an image resizing process on the image to be transmitted to the electronic frame 100 and transmit the resized image to the electronic frame 100.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller of the mobile terminal. The foregoing embodiments are merely exemplary and are not to be considered as limiting the present disclosure. The scope of the present invention should be determined by rational interpretation of the appended claims, and all changes within the scope of equivalents of the present invention are included in the scope of the present invention.

1: Server 20: Image capturing device
100: Electronic frame 151: Display
123: Optical sensor 10: Frame
170: controller

The invention claimed is:

1. An electronic frame comprising:
   a display for displaying an image;
   a frame supporting the display along edge areas of the display;
   an optical sensor disposed at a position having an area where at least a part of the edge areas of the display overlap with the frame; and
   a controller configured to:
      determine a first area hidden by the frame in the display according to a sensing signal of the optical sensor;
      resize the image from a first size to a second size such that the second size of the image is to match a size of a second area of the display aside from the first area; and
      display, in the second area, the resized image having the second size that matches the size of the second area.

2. The electronic frame of claim 1, wherein the optical sensor includes a transparent film sensor for detecting a current due to light transmission, and the transparent film sensor is attached to a vertex area in which a first edge and a second edge of the display intersect.

3. The electronic frame of claim 2, wherein the vertex area to which the transparent film sensor is attached includes a crossing area in which a first frame supporting the first edge and a second frame supporting the second edge intersect, and a display area not hidden by the frame.

4. The electronic frame of claim 3, wherein the controller is configured to:
   recognize, as the first area, an area where a current of a predetermined value or more is not detected due to the light is not transmitted by the frame; and
   recognize, as the second area, an area where a current of the predetermined value or more is detected due to the light transmission.

5. The electronic frame of claim 2, wherein the vertex area to which the transparent film sensor is attached is a crossing area in which a first frame supporting the first edge and a second frame supporting the second edge intersect.

6. The electronic frame of claim 5, wherein the display includes a liquid crystal display (LCD), and
   wherein the transparent film sensor recognizes, as the first area, an area through which light of a backlight unit of the liquid crystal display is transmitted when the image is displayed on the display.

7. The electronic frame of claim 2, wherein the transparent film sensor comprises:
   a first transparent film sensor attached to a first vertex area in which the first edge and the second edge of the display intersect; and
   a second transparent film sensor attached to a second vertex area in which a third edge and a fourth edge of the display intersect.

8. The electronic frame of claim 2, wherein the transparent film sensor is a transparent photovoltaic film.

9. The electronic frame of claim 1, further comprising a memory,
   wherein the controller is configured to:
      store, in a memory, a scale factor for resizing the image according to a size of the first area;
      resize the image to be displayed on the display based on the scale factor; and
      display the resized image on the second area.

10. The electronic frame of claim 9, wherein the scale factor is changed according to the size of the frame.

11. The electronic frame of claim 9, wherein the controller is configured to display a marker including information on the scale factor on the display with the image.

12. The electronic frame of claim 11, further comprising a wireless communication unit,
   wherein the controller is configured to:
      transmit the information on the scale factor to an external terminal through the wireless communication unit upon request of the external terminal; and
      receive the resized image based on the scale factor from the external terminal through the wireless communication unit.

13. The electronic frame of claim 1, further comprising a wireless communication unit for receiving the image data, and
   wherein the image is received from an external terminal through the wireless communication unit.

14. An image displaying method of an electronic frame comprising:
   displaying an image on a display;
   detecting a sensing signal of an optical sensor attached to an edge of the display;
   determining a first area hidden by a frame in the display according to a sensing signal of the optical sensor;
   resizing the image from a first size to a second size such that the second size is to match a size of a second area of the display aside from the first area; and
   displaying, in the second area of the display, the resized image having the second size that matches the size of the second area.

15. The method of claim 14, wherein the calculating the first area comprises setting a scale factor for resizing the image according to a size of the first area and storing the scale factor in a memory.

16. The method of claim 14, further comprising:
   when a second image is a next image after a first image is displayed on the display after the first image displayed on the display is resized based on the scale factor,
   resizing the second image based on the scale factor; and
   displaying the second image on the second area.

17. The method of claim 14, wherein the optical sensor includes a transparent film sensor for detecting a current due to light transmission, and the transparent film sensor is attached to a vertex area in which a first edge and a second edge of the display intersect.

* * * * *